(No Model.)
A. McDONALD.
CUTTER HOLDER FOR STONE DRESSING MACHINES.
No. 278,352. Patented May 29, 1883.
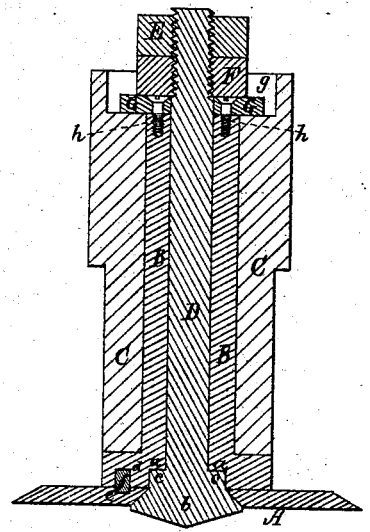
Witnesses:
S. N. Piper
E. B. Pratt
Inventor:
Alexander McDonald
by R. H. Eddy atty.

UNITED STATES PATENT OFFICE.

ALEXANDER McDONALD, OF CAMBRIDGE, MASSACHUSETTS, ASSIGNOR TO THE McDONALD STONE CUTTING MACHINE COMPANY, OF NASHUA, N. H.

CUTTER-HOLDER FOR STONE-DRESSING MACHINES.

SPECIFICATION forming part of Letters Patent No. 278,352, dated May 29, 1883.

Application filed March 5, 1883. (No model.)

*To all whom it may concern:*

Be it known that I, ALEXANDER McDONALD, of Cambridge, in the county of Middlesex, of the Commonwealth of Massachusetts, have invented a new and useful Improvement in Cutter-Holders for Stone-Dressing Machines; and I do hereby declare the same to be described in the following specification and represented in the accompanying drawing, which is a vertical and axial section of a rotary disk cutter and its supporting devices containing my invention, the nature of which is defined in the claims hereinafter presented.

My improvement relates to certain parts of a stone cutting and dressing machine as described in Letters Patent No. 222,194, granted to me on December 2, 1879, the parts in question being a disk-shaped cutter, its confining-bolt, shouldered tube or sleeve, and the tubular box or bearing for the reception of such sleeve, all of which are duly represented in Figure 7 of the drawings and described in the specification of the said patent.

In practice I have found the bolt-head liable to break off the shank and the disk cutter to revolve independently of its bolt and tubular sleeve, and, besides, I have also found it preferable to have the sleeve supported in its box by other means than two nuts screwed on the bolt, as such nuts are liable to work loose or bind the sleeve too strongly in its bearing, such sleeve, bolt, disk, cutter, and nuts revolving together and the sleeve turning in the bearing. Furthermore, on removal of the nuts from the bolt there is nothing to prevent the sleeve dropping out of the bearing.

In the drawing, A denotes the disk-shaped cutter, B the sleeve, and C the tubular box or bearing for reception of such sleeve. The bolt for confining the disk-shaped cutter to the sleeve is shown at D as provided with a head, *b*, which, where within the cutter, is tapering or conical. The holding-nuts of the bolt are represented at E and F.

In carrying out my invention I make the sleeve B with a recess, *a*, in its head, such recess being concentric with and larger in diameter than the bore of the sleeve, and, besides extending the head *b* of the bolt into and through the cutter, I project it within the recess *a* and make such head in its part or extension *c* of a diameter larger than that of the shank of the bolt, generally having the extension to correspond in size or shape with or about with that of the recess. By such means the bolt-head becomes supported within and by the sleeve, and cannot be separated from the shank by the cutter when at work. Furthermore, I recess both the cutter and the sleeve-head, and place within the two recesses (shown at *d* and *e*) a dowel, *f*, such preventing the cutter from turning and working loose on the bolt-head. I also make the box or bearing C with a recess or chamber, *g*, in its upper end, and within such recess and against the upper end of the sleeve extended to the bottom of the recess, and concentrically on the bolt, I arrange or place a flat annulus, G, which I connect to the sleeve B by screws *h h*, going through the annulus and screwed into the sleeve, all being as represented. The lower nut, F, screws against the annulus and covers the heads of the screws *h h*, the nut E serving as a set-nut to the nut F. The annulus G, by lapping on the box C and being fastened to the sleeve, sustains the sleeve, so as to prevent it from dropping out of the box, after removal of the nuts from the bolt and withdrawal of the bolt from the sleeve.

I herein make no claim to the disk-cutter supporting devices as shown in my Patent No. 222,194, as in such the bolt-carrying sleeve is not recessed to receive the head of the confining-bolt, nor does such head extend into and through the cutter and into the sleeve.

I claim—

1. The shouldered sleeve B, having in its head the bolt-receiving recess *a*, in combination with the bolt D, having its head tapering where within the cutter A, and extended beyond such cutter and into and to fit within such recess, all being substantially as represented.

2. The combination of the sustaining-sleeve B, provided at one end with the bolt-head-receiving recess *a*, and at the other with the fastening-annulus G, connected to it by screws, the box C, provided with the chamber *g*, and arranged with the said sleeve as set forth, and the screw-bolt D, having its head adapted to the disk cutter, and to extend into the recess *a*, and provided with the nuts E and F, all being substantially as shown and described.

ALEXANDER McDONALD.

Witnesses:
R. H. EDDY,
S. N. PIPER.